US008214691B1

United States Patent
Spalink et al.

(10) Patent No.: US 8,214,691 B1
(45) Date of Patent: Jul. 3, 2012

(54) SYSTEM AND METHOD FOR TESTING INTERNET FUNCTIONALITY OF A COMPUTING DEVICE IN A SIMULATED INTERNET ENVIRONMENT

(75) Inventors: Tammo Spalink, Taipei (TW); Vincent Wu, Belmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/273,183

(22) Filed: Oct. 13, 2011

Related U.S. Application Data

(60) Provisional application No. 61/542,118, filed on Sep. 30, 2011.

(51) Int. Cl.
*G06F 11/00* (2006.01)
(52) U.S. Cl. .......................................... 714/28
(58) Field of Classification Search ...................... 714/28
See application file for complete search history.

(56) References Cited

U.S. PATENT DOCUMENTS

| 6,973,518 | B2 * | 12/2005 | Purpura | 710/104 |
| 7,031,903 | B2 * | 4/2006 | Debling | 703/27 |
| 7,447,622 | B2 * | 11/2008 | Arama et al. | 703/23 |
| 7,925,692 | B2 * | 4/2011 | Dunagan | 709/203 |
| 8,001,274 | B2 * | 8/2011 | Srinivasan et al. | 709/246 |
| 2002/0091805 | A1 * | 7/2002 | Phillips et al. | 709/220 |
| 2007/0208551 | A1 * | 9/2007 | Herro | 703/13 |
| 2008/0118038 | A1 * | 5/2008 | Lien | 379/26.01 |
| 2008/0294642 | A1 * | 11/2008 | Wilson et al. | 707/10 |
| 2011/0177482 | A1 * | 7/2011 | Katz et al. | 434/322 |

FOREIGN PATENT DOCUMENTS

AT        ep0910194 a2  *  4/1999

* cited by examiner

*Primary Examiner* — Amine Riad
(74) *Attorney, Agent, or Firm* — McDermott Will & Emery LLP

(57) ABSTRACT

A system and method is disclosed for testing internet functionality of a computing device in a simulated Internet environment. In a testing environment, one or more local web servers are isolated from the Internet and configured to simulate one or more websites on the Internet. A request for a website located on the Internet is received from a computing device under test at a testing station. In response to receiving the request, information which simulates the website located on the Internet is provided to the computing device by the one or more local web servers, without access to the Internet.

20 Claims, 4 Drawing Sheets

SYSTEM AND METHOD FOR TESTING INTERNET FUNCTIONALITY OF A COMPUTING DEVICE IN A SIMULATED INTERNET ENVIRONMENT

REFERENCE TO RELATED APPLICATIONS

The present application claims priority benefit under 35 U.S.C. §119(e) from U.S. Provisional Application No. 61/542,118, filed Sep. 30, 2011, which is incorporated herein by reference in its entirety.

TECHNICAL FIELD

The subject technology relates generally to the testing of computing devices.

BACKGROUND

In a manufacturing facility, in order to fully verity connectivity and browser-related functionality of a newly-manufactured computer, the new computer must be connected to the Internet. However, problems with Internet connectivity (for example, blockages, outages, slow connections, and the like) may slow and/or inhibit the testing process.

SUMMARY

The subject technology provides a system and computer-implemented method for testing Internet functionality of a computing device in a simulated Internet environment. According to one aspect, a system includes a test station configured to test one or more computing devices and a local web server isolated from the Internet and in communication with the test station. The local web server is configured to simulate one or more websites on the Internet, and configured to respond to requests for data related to the one or more websites from one or more computing devices at the test station, the local web server including a memory. The memory includes configuration instructions that, when executed, cause the local web server to receive, from the one or more computing devices located at the test station, a request for a website located on the Internet, and, in response to receiving the request, provide to the one or more computing devices information which simulates a remote website on the Internet, wherein the test station is configured to verify that a web browser associated with the one or more computing device receives and provides the information without error, without accessing the Internet.

In another aspect, a computer-implemented method includes providing a local web server isolated from the Internet and configured to simulate one or more websites on the Internet, and configured to respond to requests for data related to the one or more websites, receiving from a computing device, at the local web server, a request for a remote website located on the Internet, and, in response to receiving the request, providing, to the computing device, information which simulates the remote website, without accessing the Internet.

In a further aspect, a machine-readable medium includes instructions that, when executed, perform a method for testing internet functionality of a computing device in a simulated Internet environment. In this regard, the method includes receiving from a computing device an request for an electronic address associated with a remote website located on the Internet, determining a local network address of a local web server based on the address request, the local web server being isolated from the Internet, and providing the local network address to the computing device for use in retrieving information which simulates the remote website, without accessing the Internet.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
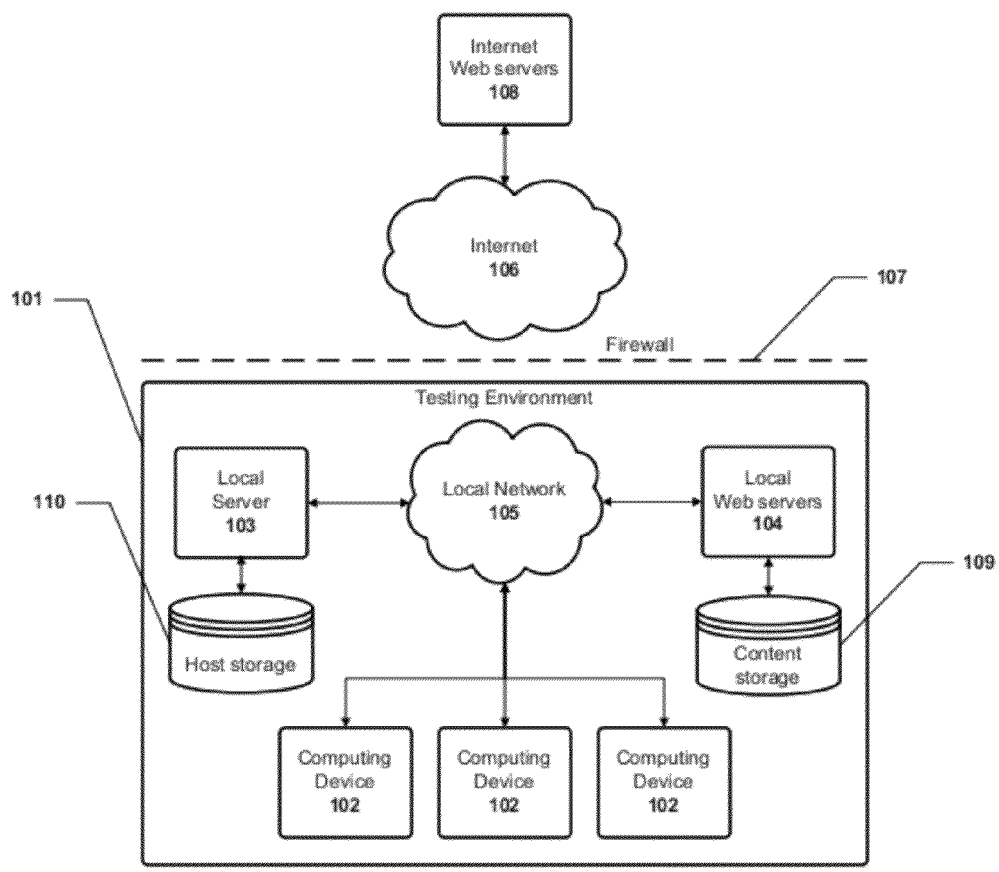
FIG. 1 is a diagram of a system for testing Internet functionality of a computing device in a simulated Internet environment according to one aspect of the subject technology.

FIG. 1 is a diagram of a system for testing Internet functionality of a computing device in a simulated Internet environment according to one aspect of the subject technology. A computer-enabled system 100 may include a testing environment 101, including one or more computing devices 102 (including, for example, a personal or notebook computer, tablet computer, smart phone. PDA, or the like) located at a test station and operably connected to a local server 103 and one or more local web servers 104 via a local network 105. Testing environment 101 may be isolated from a larger network such as the Internet 106, behind a firewall 107, and thus isolated from Internet web servers 108. In this regard, firewall 107 may prevent all machines within testing environment 101, including local server 103 and web servers 104, from any communication with Internet 106 or Internet web servers 108. Testing environment 101 may include a sequential organization of technicians, tools or machines, and/or parts to facilitate the quality assurance testing of a plurality of computing devices 102. In another aspect, testing environment 101 may include one or more technicians performing the testing of the plurality of devices 102, one device at a time.

Each local web server 104 may be isolated from the Internet and configured to replicate one or more websites on the Internet, and configured to respond to requests for data related to the one or more websites. In this regard, a local web server 104 may be configured to include one or more internal websites and/or other downloadable content. Each internal website may include content that is duplicative of another third-party website hosted on an Internet web server 108. The content of an internal website may be collected by copying the third-party website or by reconstructing the same or similar content, and storing the content in a local content storage 109 for retrieval by one or more local web servers 104. In this regard, local web servers 104 may be configured (for example, by programming instructions) to receive requests for, and to provide for the downloading of, video and/or audio, and, to provide website interaction, including via HTML, Flash, JavaScript, and the like. Each internal website may be indexed at a respective web server 104 by an internal interact protocol (IP) address. Each local web server 104 may also function as a primary DNS server for one or more websites hosted by the web server.

Local server 103 may be configured as a Domain Name System (DNS) authoritative name server for a predetermined number of Internet domains (for example, associated with one or more Internet web servers 108). Each computing device 102 may be operably connected (for example, via Ethernet cable, wireless, Bluetooth, or the like) to local network 105 and configured to use local server 103 as a DNS name server. In this regard, the web browser and/or the local operating system may request from local server 103 a translation of a domain name into an electronic address (for example, an internet protocol (IP) address). In some aspects, the web browser and/or the local operating system may act as a local DNS resolver and attempt to resolve the domain name prior to asking local server 103. Local server 103 may include an extended host storage 110 (for example, a DNS cache, database, or the like) for cross-referencing known internet domain names with internal IP addresses, and may act as a DNS resolver by iterating through host storage 110 to determine the IP address of the requested resource. Once the domain name is translated, the web browser may be forwarded to a web server 104 associated with the domain name.

By isolating one or more local web servers 104 and replicating one or more websites from the Internet, testing environment 101 may verify the Internet functionality of a computing device 102 in a fast and efficient manner, without requiring around-the-clock Internet connectivity or performance issues that may be found in a real-world environment. In this regard, a local web server 104 may receive from a computing device 102 a request for a remote website located on the Internet. In some aspects, a local domain server 103 may first resolve an electronic address associated with the remote website, and received from computing device 102, into an electronic address of local web server 104. In response to receiving the request at local web server 104, local web server 104 may provide to computing device 102 information which simulates the remote website, without accessing the Internet. A technician or automated software program, for example, at a test station, may then verify that the information received from local web server 104 displays without error on a web browser associated with computing device 102.

Figure 2:
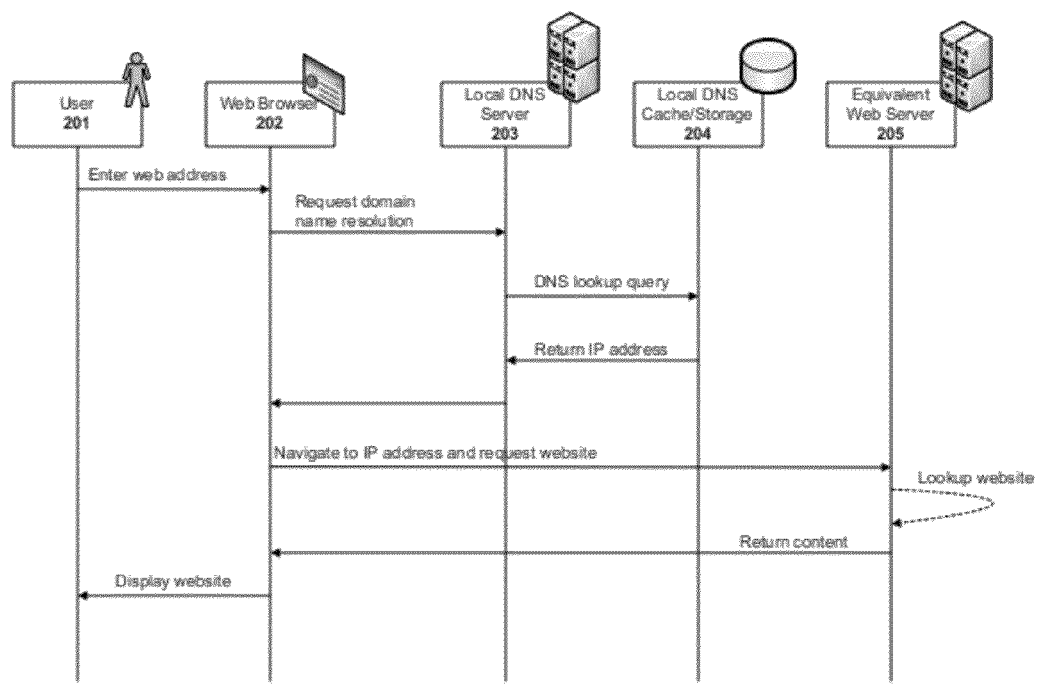
FIG. 2 is a diagram of a communication sequence for testing Internet functionality of a computing device in a simulated Internet environment according to one aspect of the subject technology.

FIG. 2 is a diagram of a communication sequence for testing Internet functionality of a computing device in a simulated Internet environment according to one aspect of the subject technology. A testing environment may include a user 201 (for example, a quality assurance technician), a web browser 202 located on a computing device under test (for example, computing device 102), a local DNS server 203 associated with a local DNS storage 204 (for example, a DNS cache), and an equivalent web server 205. Local DNS server 203 may be configured as a primary DNS server configured in the TCP/IP properties of the computing device under test.

User 201 may input a website address (for example, a URL) into web browser 202 in an attempt to cause web browser 202 to navigate to a website. Web browser 202 may first determine whether the domain name of the website address resolves to an IP address by checking a local DNS cache (for example, at the browser or operating system). If the domain name cannot immediately be resolved then web browser 202 may cause the computing device under test to send a DNS lookup query to local DNS server 203 asking to resolve the IP address for the domain name. Local DNS server 203 may access local DNS storage 204 to determine the IP address of the machine responsible for hosting the requested website. An IP address associated with the domain name may be returned back to web browser 202, which then navigates to and request web content from a web server 205 associated with the IP address. If web server 205 is responsible for hosting more than one website then web server 205 may lookup the requested website by performing its own local resolution of the DNS request. Web server 205 may then return the requested content back to web browser 202, which displays the content for the user.

The subject technology provides a computer-enabled system that replicates a portion of the Internet (for example, selected websites) to provide a realistic yet controlled quality assurance testing environment. To this end, the testing environment includes one or more servers isolated from the Internet, and configured to intercept and process DNS requests (for example, for the address www.youtube.com), and to give back an equivalent website for testing purposes. In this regard, data and/or websites may be provided based on real-world legitimate IP information.

Figure 3:
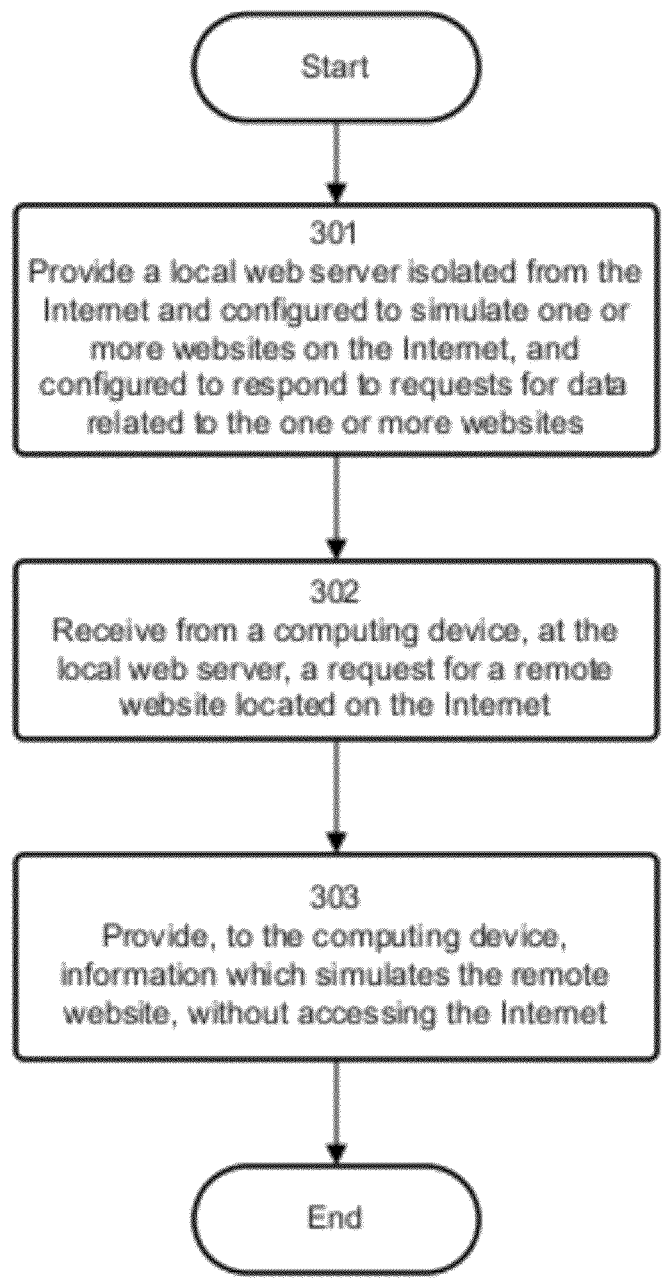
FIG. 3 is a flowchart illustrating a process for testing Internet functionality of a computing device in a simulated Internet environment according to one aspect of the subject technology.

FIG. 3 is a flowchart illustrating a process for testing Internet functionality of a computing device in a simulated Internet environment according to one aspect of the subject technology. At 301, a local web server is provided. The local web server is isolated from the Internet and configured to simulate one or more websites on the Internet, and configured to respond to requests for data related to the one or more websites. At 302, a request for a remote website located on the Internet is received from a computing device, at the local web server. In response to receiving the request, at 303, information which simulates the remote website located on the Internet is provided to the computing device, without accessing the Internet. In some aspects, in some aspects, a test station may verify that a web browser associated with the computing device receives and provides the information without error. In other aspects, an address request for a remote web server located on the Internet may be received at a domain server from the computing device, and an address of the remote web server may be resolved at the domain server into an address of the local web server, without accessing the Internet. In this regard, the address request may be received at the domain server before the request for the website is received at the local web server.

Figure 4:
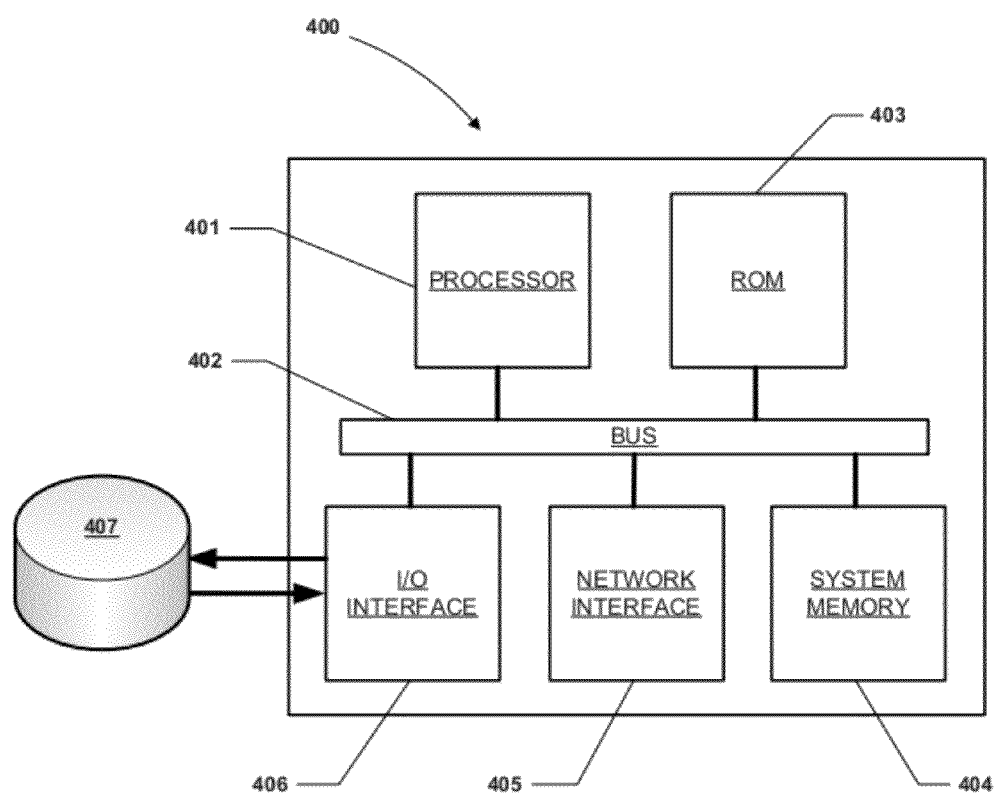
FIG. 4 is a diagram illustrating a machine or computer for testing Internet functionality of a computing device in a simulated Internet environment, including a processor and other internal components, according to one aspect of the subject technology.

FIG. 4 is a diagram illustrating a machine or computer for testing Internet functionality of a computing device in a simulated Internet environment, including a processor and other internal components, according to one aspect of the subject technology. In some aspects, a computerized device 400 (for example, a computing device 102, local server 103, remote web server 104, or the like) includes several internal components such as a processor 401, a system bus 402, read-only memory 403, system memory 404, network interface 405, I/O interface 406, and the like. In one aspect, processor 401 may also be communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). RUM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for testing internet functionality of a computing device in a simulated Internet environment, comprising:
   a test station configured to test one or more computing devices;
   a local web server isolated from the Internet and in communication with the test station, the local web server configured to simulate one or more websites located on the Internet without accessing the Internet, and configured to respond to requests from the one or more computing devices at the test station, the requests being for data related to the one or more websites, the local web server including a memory, the memory including instructions that, when executed, cause the local web server to:
      receive, from the one or more computing devices located at the test station, a request for a website located on the Internet; and
      provide to the one or more computing devices, in response to receiving the request, information which simulates the website located on the Internet, without accessing the Internet, wherein the test station is configured to verify that a web browser associated with the one or more computing devices receives and provides the information without error.

2. The system of claim 1, further comprising:
   a local domain server configured to resolve a request for an Internet domain name received from the one or more computing devices into an electronic address within a network isolated from the Internet.

3. The system of claim 2, wherein the local domain server is configured to:
   receive from the one or more computing devices a request for a web server located on the Internet; and
   resolve an address of the web server located on the internet into an address of the local web server, without accessing the Internet,
   wherein the request for the web server is received by the local domain server before the request for the website is received by the local web server.

4. The system of claim 3, wherein the local domain server is isolated from the Internet.

5. The system of claim 3, wherein the local domain server is configured to resolve the address of the web server located on the Internet into an internet protocol address of the local web server.

6. The system of claim 3, wherein resolving the address of the web server located on the Internet into an address of the local web server includes querying a local domain name system cache.

7. The system of claim 3, wherein the local domain server is configured as an authoritative name server.

8. The system of claim 3, further comprising:
   a local network isolated from the Internet, wherein the one or more computing devices at the test station, local web server, and local domain server are operably connected over the local network.

9. A computer-implemented method for testing internet functionality of a computing device in a simulated Internet environment, comprising:
   providing a local web server isolated from the Internet and configured to simulate one or more websites located on the Internet, and configured to respond to requests for data related to the one or more websites located on the Internet, without accessing the Internet;
   receiving from a computing device, at the local web server, a request for a remote website located on the Internet; and
   providing to the computing device, in response to receiving the request, information which simulates the remote website, located on the Internet, without accessing the Internet.

10. The computer-implemented of claim 9, further comprising:
    verifying that a web browser associated with the computing device receives and provides the information without error.

11. The computer-implemented of claim 9, further comprising:
    receiving from the computing device, at a domain server, an address request for a remote web server located on the Internet; and
    resolving, at the domain server, an address of the remote web server into an address of the local web server, without accessing the Internet,
    wherein the address request is received at the domain server before the request for the remote website is received at the local web server.

12. The computer-implemented of claim 11, wherein the domain server is isolated from the Internet.

13. The computer-implemented of claim 11, wherein the address of the remote web server is resolved into an internet protocol address of the local web server.

14. The computer-implemented of claim 11, further comprising:
    performing, by the domain server, a query of a local domain name system cache.

15. The computer-implemented of claim 11, wherein the address of the local web server includes an electronic address within a network isolated from the Internet.

16. The computer-implemented of claim 9, wherein the information which simulates the remote website includes interactive content duplicated from the remote website.

17. A machine-readable medium including instructions that, when executed, perform a method for testing internet functionality of a computing device in a simulated Internet environment, the method comprising:
- receiving from a computing device a request for an electronic address associated with a remote website located on the Internet;
- determining a local network address of a local web server based on the address request, the local web server being isolated from the Internet; and
- providing the local network address to the computing device for use in retrieving, from the local web server, information which simulates the remote website located on the Internet, without accessing the Internet.

18. The machine-readable medium of claim 17, wherein the computing device and local web server are isolated from the Internet.

19. The machine-readable medium of claim 17, wherein the local network address includes an internet protocol address within a network isolated from the Internet.

20. The machine-readable medium of claim 17, wherein determining the local network address includes:
- resolving, at a domain server, an electronic address of a server associated with the remote website into an electronic address of the local web server, without accessing the Internet.

* * * * *